United States Patent [19]

Dykstra

[11] Patent Number: 4,625,757

[45] Date of Patent: Dec. 2, 1986

[54] DIFFERENTIAL PRESSURE FLUID FLOW REGULATING DEVICE

[75] Inventor: Raymond C. Dykstra, Boulder, Colo.

[73] Assignee: Cobe Laboratories, Inc., Lakewood, Colo.

[21] Appl. No.: 744,373

[22] Filed: Jun. 13, 1985

[51] Int. Cl.[4] ............................................. F16K 17/34
[52] U.S. Cl. ...................................... 137/504; 251/86
[58] Field of Search .............. 137/504, 517, 498, 541, 137/DIG. 2, 524; 251/86, 87, 82

[56] References Cited

U.S. PATENT DOCUMENTS

| | | | |
|---|---|---|---|
| 414,509 | 11/1889 | Fisher | 137/DIG. 2 |
| 1,129,763 | 2/1915 | Trojovsky | 137/524 |
| 2,149,673 | 3/1939 | Godfrey | 137/504 X |
| 2,984,261 | 5/1961 | Kates | 137/504 X |
| 2,999,666 | 9/1961 | Sjögren | 251/82 |
| 3,402,735 | 9/1968 | Kates | 137/501 |
| 3,441,052 | 4/1969 | Schilling | 137/517 |
| 3,958,596 | 5/1976 | Garrard | 137/504 |

Primary Examiner—Martin P. Schwadron
Assistant Examiner—Stephen M. Hepperle

[57] ABSTRACT

A fluid flow regulating device comprising a housing defining an inlet, an outlet orifice, and a fluid flow passage therein between the inlet and the outlet orifice, a movable piston in the housing having an upstream surface and a downstream surface exposed to fluid flowing through the passage, means for providing a drop in pressure between the upstream surface and the downstream surface as a function of fluid flow rate through the device, and a closure member that is connected to the movable piston and has an externally curved surface that is movable between positions adjacent to and in front of the outlet orifice as the piston moves in response to changes in the magnitude of the drop in pressure.

14 Claims, 7 Drawing Figures

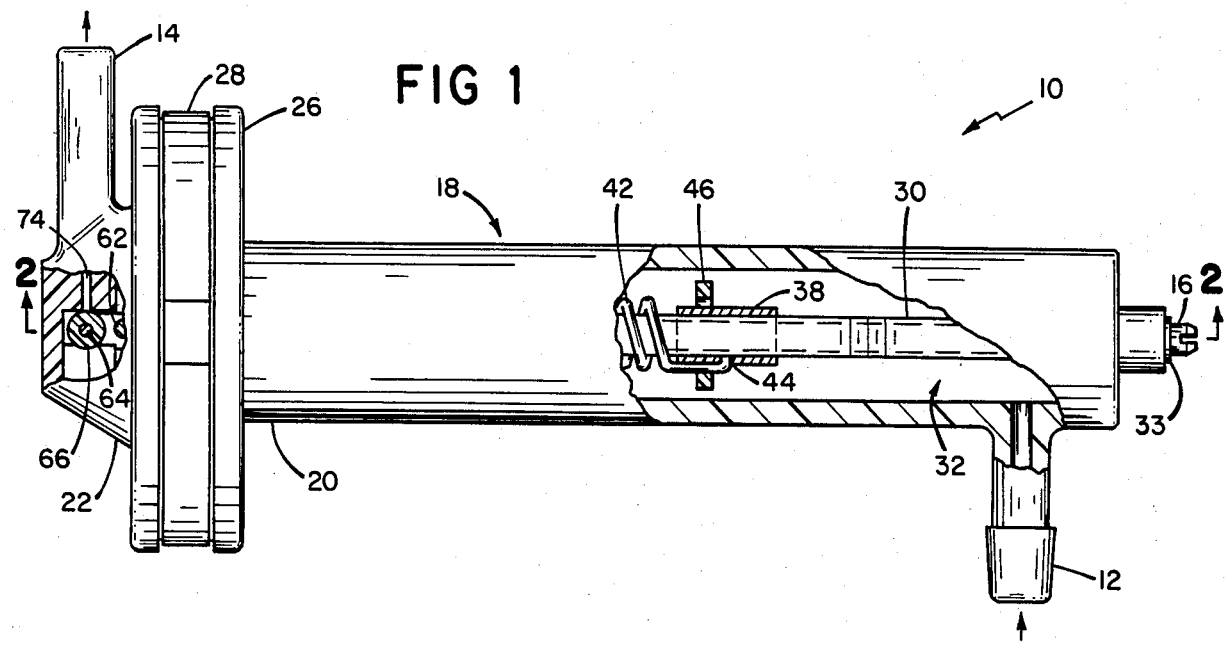
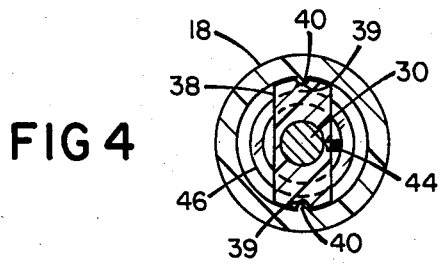
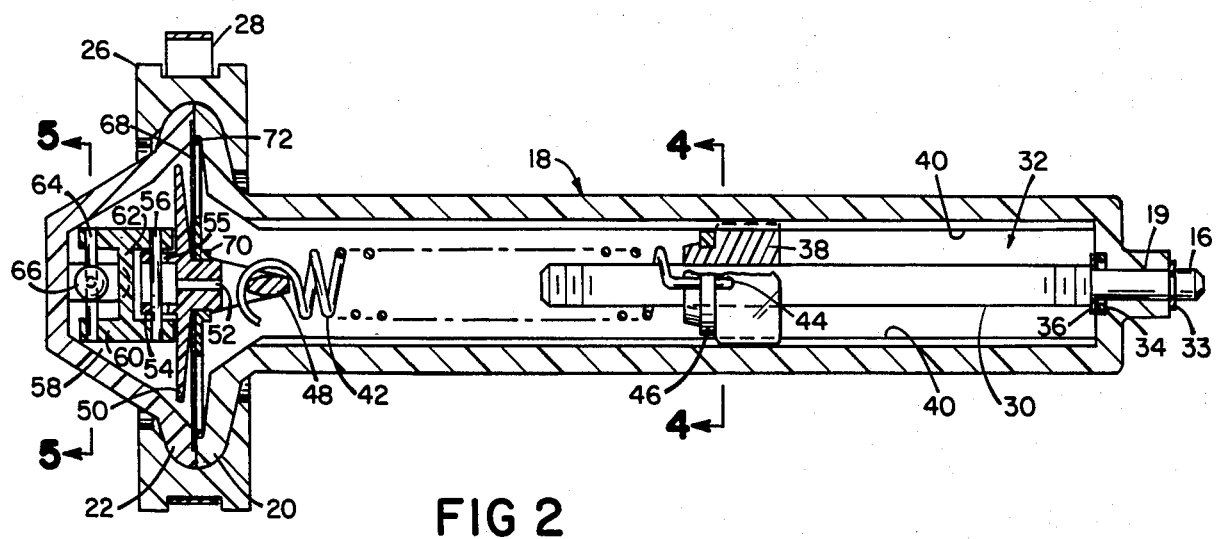

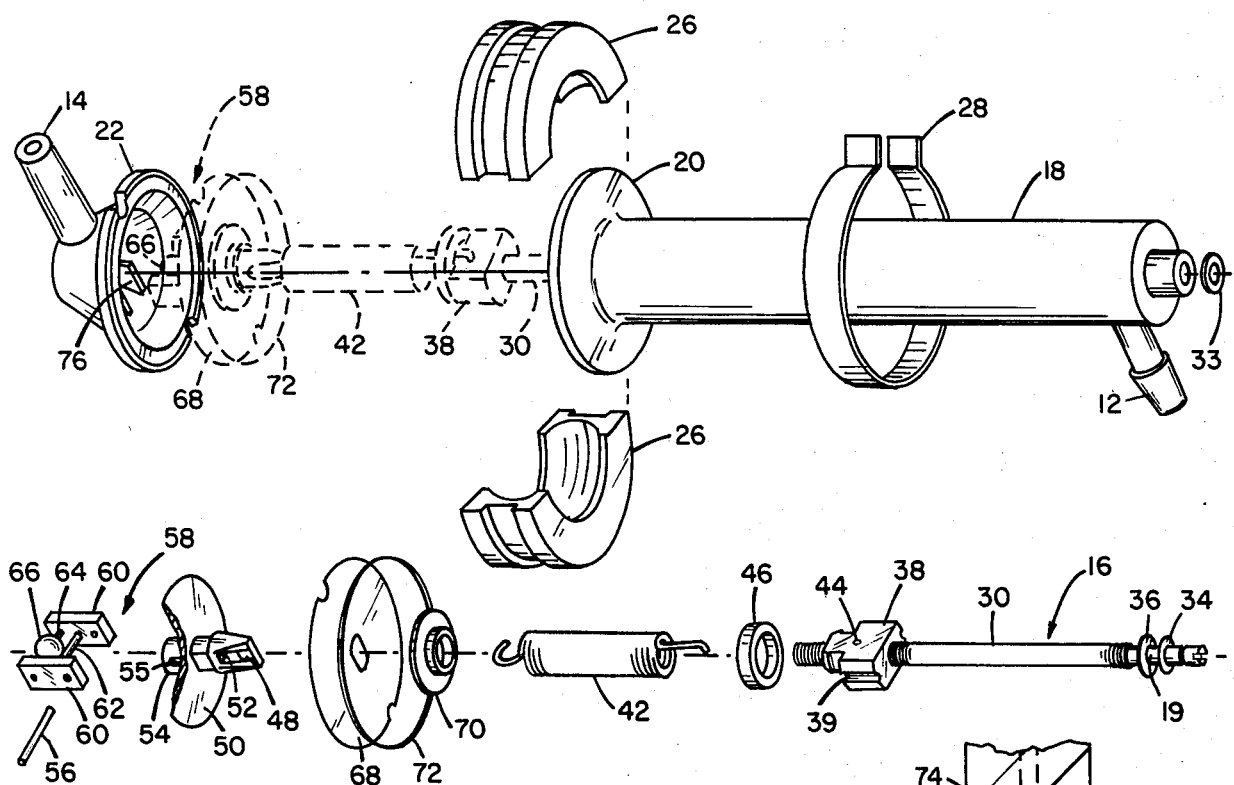
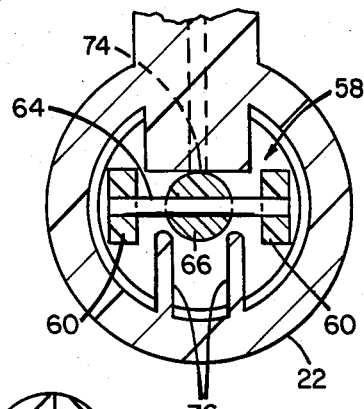
FIG 5
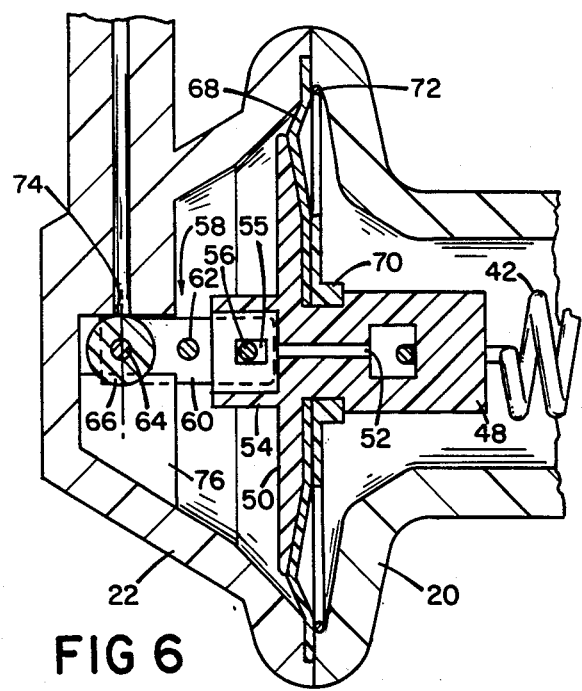
FIG 3
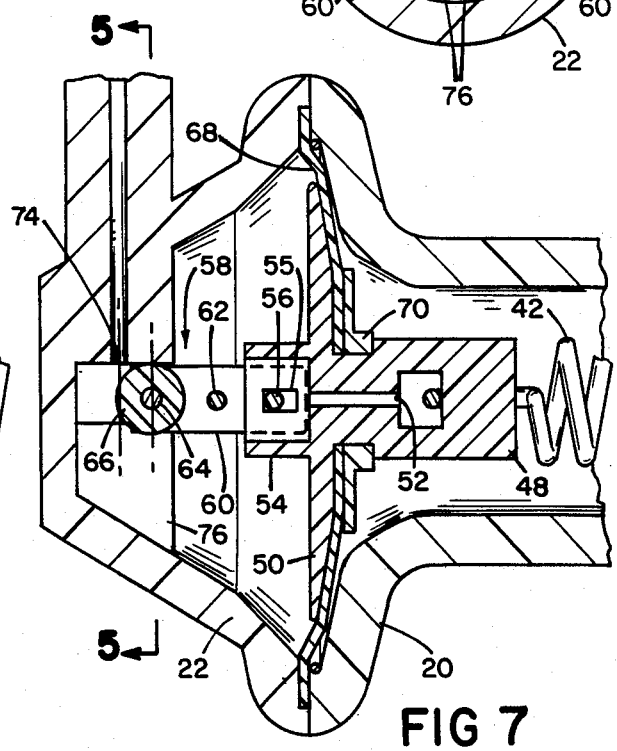
FIG 6    FIG 7

DIFFERENTIAL PRESSURE FLUID FLOW REGULATING DEVICE

FIELD OF THE INVENTION

The invention relates to fluid flow regulating devices.

BACKGROUND OF THE INVENTION

The relationship between flow rate and pressure drop through a flow restriction has been employed to control flow rate. E.g., in Kates U.S. Pat. No. 3,402,735, fluid upstream and downstream of a flow restriction is exposed to opposite faces of a piston that is spring-biased in the direction of the upstream face and moves toward closing an outlet when displaced in the opposite direction owing to a temporary increase in the difference in pressure between the upstream face and the downstream face caused by increased flow.

SUMMARY OF THE INVENTION

It has been discovered that a fluid flow regulating device employing differential pressure on opposite sides of a movable piston can be made to very accurately control flow rate by using a closure member that has an externally curved surface that is movable between positions adjacent to and in front of an outlet orifice as the piston moves in response to changes in the magnitude of the difference in pressure on opposite sides of the piston. Because the closure member has an externally curved surface, when the outlet orifice is fully open, part of the closure member can be positioned in front of, but spaced from, the orifice, and only a small displacement of the closure member is necessary to fully block the orifice.

In preferred embodiments the closure member is a spherical ball; the spherical ball is rotatably mounted on a dowel connected to the piston by pivotal support members; a pair of guide ribs opposite the outlet orifice maintain the spherical ball in the vicinity of the outlet orifice; the piston is a plate having a restricted flow passage through it; an extension spring is used to bias the piston opposite the direction of flow; and the spring is connected to a support mounted on a threaded shaft so that the flow rate of the device can be easily adjusted by rotating the threaded shaft.

Other features and advantages of the invention will be apparent from the following detailed description of a preferred embodiment thereof.

DESCRIPTION OF THE PREFERRED EMBODIMENT

The drawings will be described first.

DRAWINGS

FIG. 1 is an elevation, partially cut away, of a fluid flow regulating device according to the invention.

FIG. 2 is a vertical sectional view, taken at 2—2 of FIG. 1, of the FIG. 1 device.

FIG. 3 is a diagrammatic exploded perspective view of the FIG. 1 device showing the various components of it.

FIG. 4 is a horizontal sectional view of the FIG. 1 device, taken at 4—4 of FIG. 2.

FIG. 5 is a horizontal sectional view, taken at 5—5 of FIG. 2, of the FIG. 1 device.

FIGS. 6 and 7 are diagrammatic sectional views showing the piston and closure member of the FIG. 1 device in different positions.

STRUCTURE

Referring to FIG. 1, there is shown fluid flow regulating device 10 having inlet 12 and outlet 14 for receiving and delivering a fluid to be regulated. Extending from the inlet end of device 10 is slotted control rod 16 for adjusting the flow rate through device 10. Inlet 12 and outlet 14 are formed in plastic (ABS) housing 18.

Referring to FIGS. 2 and 3, it is seen that housing 18 is made of two pieces 20, 22 joined together by two-piece clamp 26 (FIG. 3) and retainer 28. Smooth portion 19 of slotted rod 16 is mounted for rotation in the end of housing piece 20 (FIG. 2), and threaded portion 30 of rod 16 extends into fluid passage 32. Rod 16 is prevented from moving into housing piece 20 by retaining clip 33 on the outside of housing 20, and is sealed to housing 20 by O-ring 34 and washer 36 on the inside.

Screwed onto threaded portion 30 is spring support 38, having slots 39 (FIG. 4) that engage longitudinal tracks 40, preventing rotation of support 38. The upper end of spring 42 (0.041" diameter, 316 stainless steel, 29±1 turns, 0.375" diameter) is held in hole 44 of member 38 by ring 46. The lower end of threaded portion 30 passes through the center of spring 42 (FIG. 2). The lower end of spring 42 is hooked around extension 48 of piston plate 50.

Piston plate 50 is 1.250" in diameter and has restricted flow passage 52 (0.054" diameter, 0.25" long) passing through it. On the other side of piston plate 50 from extension 48 is cylindrical support 54 formed around the outlet of restricted flow passage 52. Support 54 has a pair of slots 55, through which passes upper dowel 56 of H-shaped ball carrier 58, which includes legs 60 and a cross-member 62. At the lower ends of legs 60 is lower dowel 64, on which is supported spherical plastic closure member 66 (0.187" diameter Teflon TFE).

On the upstream surface of piston plate 50 is diaphragm 68 (1.625" diameter, 0.020±0.001" thick silicone rubber, 40–60 Durometer), which is retained on the upper surface of piston plate 50 by retaining ring 70. The periphery of diaphragm 68 is sealed between housing pieces 20, 22 along with rubber O-ring 72. The diameter of the flow passage where pieces 20, 22 are joined is 1.375".

As is seen best in FIGS. 6 and 7, formed in the bottom of housing piece 22 is outlet orifice 74 (0.062±0.001" diameter). Opposite outlet orifice 74 (FIG. 5) are pair of guide ribs 76 spaced by 0.150" and positioned to retain spherical closure member 66 within the vicinity of outlet orifice 74.

Operation

In operation, e.g., in regulating flow of dialysate in a dialysate preparation machine, fluid flows into inlet 12, through passage 32 and out of outlet 14. In traveling through passage 32, fluid flows through restricted passage 52 of piston plate 50, undergoing a pressure drop that is a function of the flow rate through device 10. This creates a difference in pressure at the upstream surface of piston plate 50 (above diaphragm 68) and at the downstream surface of piston plate 50, creating a net force on piston plate 50 in the downstream direction.

When the net force owing to differential pressure on piston plate 50 is less than the force of spring 42, plate 50 rests against housing piece 20, as shown in FIG. 7. As flow increases, the differential force on piston plate 50 equals the force on spring 42, and flow control begins, with piston plate 50 moving toward the outlet end of device 10, and spherical closure member 66 rolling closer to and extending partially in front of orifice 74, but not preventing flow into outlet orifice 74. Closure member 66 is automatically aligned with orifice 74, owing to water flowing past it into outlet orifice 74. If there is an increase in flow through restricted passage 52, a larger pressure drop results, causing further downstream displacement of piston plate 50, in turn causing closure member 66 to roll directly in front of outlet orifice 74, and to be sucked into orifice 74, as shown in FIG. 6. This temporarily restricts the flow, decreasing the pressure drop and causing the piston to move upstream, and the outlet orifice to be uncovered, holding the flow constant. Because closure member 66 has an externally curved surface, when orifice 74 is fully open, part of closure member 66 can be positioned in front of, but spaced from, orifice 74. As closure member 66 need only travel ½ the diameter of outlet orifice 74 to go from a fully open position to a fully closed position, very sensitive throttling is provided. If large flows cause plate 50 to be forced all the way against housing piece 22, member 66 is not forced to go past orifice 74, because it is sucked into orifice 74, dowel 56 remaining stationary in slot 55 while piston plate 50 continues moving. Movement of diaphragm 68 with piston 50 does not involve any force.

By rotating rod 16, spring support 38 moves along threaded portion 30, thereby adjusting the force on spring 42 which counteracts the differential force on piston plate 50 and the flow rate that results. The use of extension spring 42 avoids problems associated with buckling of compression springs and inaccuracies caused thereby.

Device 10 provides constant flow over a wide pressure range, because increases in total pressure drop over device 10 (e.g., caused by increased inlet pressure and constant outlet pressure) are taken up by the pressure drop at outlet orifice 74 and not at restricted flow passage 52. During flow control, in addition to the differential pressure force on piston 50, the force of spring 42 is resisted by the force pulling spherical closure member 66 toward outlet 74 (transmitted through legs 60). An increase in the total pressure drop in device 10 causes spring 42 to extend, and closure member 66 to move toward outlet 74, in turn increasing the pressure drop there by partially blocking orifice 74. At the same time, closure member 66 is sucked partially into orifice 74 as its center goes beyond the edge of orifice 74, greatly increasing the force exerted by it on spring 42 through legs 60. Thus, the ability of the closure member to increase the pressure drop at the outlet orifice when an increased pressure drop is imposed on the overall device makes it less likely that the increase in pressure drop on the overall device will be taken up at the restricted flow passage, something that would tend to increase flow rate.

Device 10 also is insensitive to particulate contamination at outlet orifice 74 (as clogging of orifice 74 automatically causes a smaller flow rate and differential pressure, in turn causing closure member 66 to uncover orifice 74). With the exception of restricted flow passage 52 and the pressure drop at outlet orifice 74, there are small pressure losses in fluid flow through device 10.

Other Embodiments

Other embodiments of the invention are within the scope of the following claims. For example, in addition to being spherical, the closure member can have another shape involving an externally curved surface; e.g., the closure member could be cylindrical.

What is claimed is:

1. A fluid flow regulating device comprising
   a housing defining an inlet, an outlet orifice having an outlet axis along the direction of flow through it, and a fluid flow passage therein between said inlet and said outlet orifice,
   a movable piston in said housing having an upstream surface and a downstream surface exposed to fluid flowing through said passage,
   a spring biasing said piston in the upstream direction,
   means for providing a drop in pressure between said upstream surface and said downstream surface as a function of fluid flow rate through said device, and
   a closure member that is connected to said movable piston and has an externally curved surface that is movable along a closure member path perpendicular to said outlet axis between positions adjacent to and in front of said outlet orifice as said piston moves in response to changes in the magnitude of said drop in pressure,
      said surface being curved about an axis that is perpendicular to both said outlet axis and said closure member path,
      said closure member being movable so as to permit pivoting of said closure member about an edge of said housing defining said outlet orifice at a point of contact of said closure member with said edge.

2. The fluid flow regulating device of claim 1 wherein said externally curved surface is a portion of a sphere, and wherein said outlet orifice is circular in shape, having a smaller diameter than the diameter of said portion of a sphere.

3. The fluid flow regulating device of claim 2 wherein said closure member is a spherical ball mounted for rotation on a first dowel passing through its center, the longitudinal axis of said first dowel being transverse to the direction of movement of said piston and said curved surface.

4. The fluid flow regulating device of claim 3 wherein said housing includes a pair of guide ribs extending into said fluid flow passage opposite said outlet orifice, said guide ribs being spaced and positioned to restrict movement of said ball along said first dowel, to maintain said spherical ball in the vicinity of said outlet orifice.

5. The fluid flow regulating device of claim 3 wherein said dowel is mounted between the ends of two transverse supports that are pivotally connected to said movable piston.

6. The fluid flow regulating device of claim 5 wherein said pair of supports are connected to said piston via a second dowel extending between the other ends of them, said second dowel passing through slots on said piston extending in the direction of movement of said piston.

7. The fluid flow regulating device of claim 1 wherein said piston has a restricted flow passage through it to provide said drop in pressure.

8. The fluid flow regulating device of claim 1 wherein said piston is in the shape of a flat plate positioned transverse to the direction of flow, and further comprising a diaphragm supported on the upstream side of said plate and sealed at its periphery to said housing.

9. The fluid flow regulating device of claim 8 wherein said housing comprises two pieces sealing between them the periphery of said diaphragm.

10. The fluid flow regulating device of claim 1 wherein said movable piston is biased in the upstream direction via an extension spring.

11. The fluid flow regulating device of claim 10 wherein said extension spring is connected to an adjustable support that is adjustably positioned within said housing.

12. The fluid flow regulating device of claim 11 wherein said adjustable support is mounted on a threaded shaft within said housing, further comprising means to rotate said threaded shaft to thereby extend or contract said spring.

13. The fluid flow regulating device of claim 12 wherein the end of said threaded shaft passes through the center of said extension spring.

14. The fluid flow regulating device of claim 1 wherein said closure member is rotatably mounted about an axis of rotation, said axis of rottion being movable along said closure member path.

* * * * *